US012108338B2

(12) United States Patent
Xue et al.

(10) Patent No.: US 12,108,338 B2
(45) Date of Patent: Oct. 1, 2024

(54) SIGNAL TRANSMISSION METHOD, TERMINAL DEVICE, AND NETWORK DEVICE

(71) Applicant: HUAWEI TECHNOLOGIES CO., LTD., Guangdong (CN)

(72) Inventors: Lixia Xue, Beijing (CN); Zheng Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 419 days.

(21) Appl. No.: 17/520,132

(22) Filed: Nov. 5, 2021

(65) Prior Publication Data

US 2022/0060992 A1 Feb. 24, 2022

Related U.S. Application Data

(63) Continuation of application No. PCT/CN2020/089208, filed on May 8, 2020.

(30) Foreign Application Priority Data

May 12, 2019 (CN) .......................... 201910391324.5

(51) Int. Cl.
*H04W 52/02* (2009.01)
*H04W 72/23* (2023.01)

(52) U.S. Cl.
CPC ....... *H04W 52/0235* (2013.01); *H04W 72/23* (2023.01)

(58) Field of Classification Search
CPC ............. H04W 52/00; H04W 52/0209; H04W 52/0212; H04W 52/0225; H04W 52/0235;
(Continued)

(56) References Cited

U.S. PATENT DOCUMENTS

2017/0367046 A1* 12/2017 Papasakellariou ..........................
H04W 72/0446
2019/0132005 A1* 5/2019 Chen ..................... H03M 13/29
(Continued)

FOREIGN PATENT DOCUMENTS

CN 109151885 A 1/2019
CN 109391417 A 2/2019
(Continued)

OTHER PUBLICATIONS

Apple Inc., "Design of PDCCH-based Power Saving Signal and Channel," 3GPP TSG RAN WG1 #97, R1- 1907345, Reno, USA, May 13-17, 2019, 12 pages.
PCT International Search Report and Written Opinion issued in International Application No. PCT/CN2020/089208 on Nov. 8, 2020, 15 pages (with English translation).
(Continued)

*Primary Examiner* — Matthew W Genack
(74) *Attorney, Agent, or Firm* — Fish & Richardson P.C.

(57) ABSTRACT

The present disclosure discloses an example signal transmission method and an example terminal device. One example signal transmission method includes monitoring, by a terminal device and based on a size of first downlink control information (DCI), the first DCI and second DCI that are sent by a network device, where the first DCI is carried on a power saving signal shared by a plurality of terminal devices including the terminal device, and the second DCI is carried on a terminal device specific power saving signal. It is determined by the terminal device and based on at least one of the first DCI or the second DCI, whether to monitor a data channel in a first time period.

19 Claims, 6 Drawing Sheets

(58) Field of Classification Search
CPC ............... H04W 72/20; H04W 72/23; H04W 72/232; H04W 72/50; H04W 72/51
See application file for complete search history.

(56) References Cited

U.S. PATENT DOCUMENTS

| | | | | |
|---|---|---|---|---|
| 2019/0386771 A1* | 12/2019 | Liu | ...................... | H04B 7/0456 |
| 2020/0150736 A1* | 5/2020 | Nam | ...................... | G06F 1/3209 |
| 2020/0337029 A1* | 10/2020 | Yi | ...................... | H04L 5/0053 |

FOREIGN PATENT DOCUMENTS

| | | |
|---|---|---|
| CN | 109392112 A | 2/2019 |
| CN | 109699054 A | 4/2019 |
| WO | 2016165388 A1 | 10/2016 |
| WO | 2017136021 A1 | 8/2017 |
| WO | 2019019951 A1 | 1/2019 |
| WO | 2019029657 A1 | 2/2019 |

OTHER PUBLICATIONS

Samsung, "DCI Formats for NR," 3GPP TSG RAN WG1 #89, R1-1707996, Hangzhou, China, May 15-19, 2017, 3 pages.
Office Action in Chinese Appln. No. 201910391324.5, dated Apr. 5, 2023, 9 pages.
Extended European Search Report issued in European Application No. 20806744.7 on Apr. 26, 2022, 8 pages.
MediaTek Inc., "Design of PDCCH-based power saving signal/channel for NR," 3GPP TSG RAN WG1 Meeting #97, R1-1906548, Reno, USA, May 13-17, 2019, 16 pages.
Qualcomm Incorporated, "PDCCH-based power saving channel design," 3GPP TSG RAN WG1 Meeting #97, R1-1907294, Reno, USA, May 13-17, 2019, 16 pages.
Qualcomm Incorporated, "Potential Techniques for UE Power Saving," 3GPP TSG-RAN WG1 #96, R1-1903016, Athens, Greece, Feb. 25-Mar. 1, 2019, 33 pages.
Result of Consultation in European Appln No. 20806744.7, dated Mar. 12, 2024, 10 pages.

* cited by examiner

SIGNAL TRANSMISSION METHOD, TERMINAL DEVICE, AND NETWORK DEVICE

CROSS-REFERENCE TO RELATED APPLICATIONS

This application is a continuation of International Application No. PCT/CN2020/089208, filed on May 8, 2020, which claims priority to Chinese Patent Application No. 201910391324.5, filed on May 12, 2019. The disclosures of the aforementioned applications are hereby incorporated by reference in their entireties.

TECHNICAL FIELD

This application relates to the communication field, and more specifically, to a signal transmission method, a terminal device, and a network device.

SUMMARY

This application provides a signal transmission method, a terminal device, and a network device, to reduce complexity of monitoring a power saving signal by user equipment.

According to a first aspect, this application provides a signal transmission method. The method includes: A terminal device monitors, based on a size of first downlink control information (DCI), the first DCI and second DCI that are sent by a network device, where the first DCI is carried on a power saving signal shared by a plurality of terminal devices including the terminal device, and the second DCI is carried on a terminal device specific power saving signal; and the terminal device determines, based on the detected first DCI and/or the detected second DCI, whether to monitor a data channel in a first time period.

In the foregoing technical solution, the terminal device may simultaneously monitor the two types of DCI: the first DCI and the second DCI based on the size of the first DCI, and does not need to separately monitor the first DCI and the second DCI, so that complexity of monitoring the power saving signals by the terminal device can be reduced.

In a possible implementation, the size of the first DCI is the same as a size of the second DCI.

In a possible implementation, the first DCI includes at least one information block, each of the at least one information block includes at least one information field, and different information blocks are used to indicate parameters used by different terminal devices to monitor a data channel in the first time period, and the at least one information block includes a first information block, and an information field in the first information block is used to indicate a parameter used by the terminal device to monitor a data channel in the first time period.

In the foregoing technical solution, the first DCI also carries the parameter used to indicate the terminal device to monitor a data channel in the first time period. Because a first power saving signal is a shared signal, and a priority of the first power saving signal is usually higher than that of a specific signal, when resources are limited, there is a low probability that the first power saving signal cannot be sent. In this way, when the resources are limited, the terminal device may still obtain the parameter used by the terminal device to monitor a data channel in the first time period, so that a power saving signal exerts a full effect.

In a possible implementation, information fields included in at least two of the at least one information block are different.

In the foregoing technical solution, for different terminal devices, the first DCI may carry different parameters used to monitor a data channel, so that each terminal device monitors a data channel by using a correct parameter.

In a possible implementation, the information field in the first information block is used to indicate a status value in a first status value set, a status value of an information field in the second DCI is a status value in a second status value set, and the first status value set is a subset of the second status value set.

In a possible implementation, when the first DCI is a first bit sequence value, the first DCI is used to indicate the plurality of terminal devices to monitor a data channel in the first time period.

In the foregoing technical solution, when the second DCI fails to be sent (for example, when a second power saving signal cannot be sent due to limited resources), the first DCI is used to wake up all terminal devices. In this way, impact caused by the second power saving signal being blocked can be reduced, and power saving performance of the power saving signal can be improved.

In a possible implementation, the first DCI and the second DCI use different radio network temporary identifiers (RNTIs).

In the foregoing technical solution, the first DCI and the second DCI are scrambled by using different RNTIs, so that the terminal device distinguishes between the first DCI and the second DCI, thereby ensuring correct parsing of the first DCI and the second DCI.

In a possible implementation, monitoring of the first DCI and monitoring of the second DCI are performed in a same control resource set (CORESET).

In the foregoing technical solution, the first DCI and the second DCI are transmitted in the same CORESET, so that a quantity of CORESETs in which the terminal device performs monitoring can be reduced, thereby further reducing complexity of monitoring the power saving signal by the terminal device.

In a possible implementation, monitoring of the first DCI and monitoring of the second DCI are performed on a candidate control channel resource in a same search space set.

In the foregoing technical solution, further, the first DCI and the second DCI are transmitted in the same search space set, so that complexity of monitoring the power saving signal by the terminal device can be further reduced.

In a possible implementation, when the size n1 of the first DCI is greater than a quantity n2 of information bits of the second DCI, both the size of the first DCI and the size of the second DCI are n2, and (n2−n1) bits in the second DCI are padding bits.

In a possible implementation, when the size n1 of the first DCI is less than a quantity n2 of information bits of the second DCI, both the size of the first DCI and the size of the second DCI are n1, and the second DCI is n1 information bits of the n2 information bits of the second DCI.

According to a second aspect, this application provides a signal transmission method. The method includes: A network device determines first downlink control information (DCI) and second DCI based on a size of the first DCI, where the first DCI is carried on a power saving signal shared by a plurality of terminal devices including the terminal device, and the second DCI is carried on a terminal device specific power saving signal; and the network device sends the first DCI and the second DCI to the terminal device.

In a possible implementation, the size of the first DCI is the same as a size of the second DCI.

In the foregoing technical solution, because the size of the first DCI is the same as the size of the second DCI, the terminal device only needs to monitor DCI that is carried on the power saving signal and that is of a same size and does not need to separately monitor the first DCI and the second DCI. Therefore, complexity of monitoring the power saving signals by the terminal device can be reduced.

In a possible implementation, that the network device determines the second DCI based on a quantity of information bits of the first DCI includes: When the size n1 of the first DCI is greater than a quantity n2 of information bits of the second DCI, the network device adds (n2−n1) padding bits to a bit sequence of the second DCI, to enable both the size of the first DCI and the size of the second DCI to be n1.

In the foregoing technical solution, the network device may adjust the size of the second DCI, to enable the size of the first DCI to be the same as the size of the second DCI. In this way, the technical solution of this application may still be used when the quantity of information bits of the first DCI is different from the quantity of information bits of the second DCI, so as to extend an application scope of the transmission method in this application.

In a possible implementation, that the network device determines the second DCI based on a quantity of information bits of the first DCI includes: When the size n1 of the first DCI is less than a quantity n2 of information bits of the second DCI, the network device truncates n1 information bits in an information bit sequence of the second DCI, to enable both the size of the first DCI and the size of the second DCI to be n1.

In the foregoing technical solution, the network device may adjust the size of the second DCI, to enable the size of the first DCI to be the same as the size of the second DCI. In this way, the technical solution of this application may still be used when the quantity of information bits of the first DCI is different from the quantity of information bits of the second DCI, so as to extend an application scope of the transmission method in this application.

In a possible implementation, the first DCI includes at least one information block, each of the at least one information block includes at least one information field, and different information blocks are used to indicate parameters used by different terminal devices to monitor a data channel in a first time period; and the at least one information block includes a first information block, and an information field in the first information block is used to indicate a parameter used by the terminal device to monitor a data channel in the first time period.

In the foregoing technical solution, the first DCI also carries the parameter used to indicate the terminal device to monitor a data channel in the first time period. Because a first power saving signal is a shared signal, and a priority of the first power saving signal is usually higher than that of a specific signal, when resources are limited, there is a low probability that the first power saving signal cannot be sent. In this way, when the resources are limited, the terminal device may still obtain the parameter used by the terminal device to monitor a data channel in the first time period, so that a power saving signal exerts a full effect.

In a possible implementation, information fields included in at least two of the at least one information block are different.

In the foregoing technical solution, for different terminal devices, the first DCI may carry different parameters used to monitor a data channel, so that each terminal device monitors a data channel by using a correct parameter.

In a possible implementation, the information field in the first information block is used to indicate a status value in a first status value set, a status value of an information field in the second DCI is a status value in a second status value set, and the first status value set is a subset of the second status value set.

In a possible implementation, when the first DCI is a first bit sequence value, the first DCI is used to indicate the plurality of terminal devices to monitor a data channel in the first time period.

In the foregoing technical solution, when the second DCI fails to be sent (for example, when a second power saving signal cannot be sent due to limited resources), the first DCI is used to wake up all terminal devices. In this way, impact caused by the second power saving signal being blocked can be reduced, and power saving performance of the power saving signal can be improved.

In a possible implementation, the first DCI and the second DCI use different radio network temporary identifiers (RN-TIs).

In the foregoing technical solution, the first DCI and the second DCI are scrambled by using different RNTIs, so that the terminal device distinguishes between the first DCI and the second DCI, thereby ensuring correct parsing of the first DCI and the second DCI.

In a possible implementation, the first DCI and the second DCI are sent in a same control resource set (CORESET).

In the foregoing technical solution, the first DCI and the second DCI are transmitted in the same CORESET, so that a quantity of CORESETs in which the terminal device performs monitoring can be reduced, thereby further reducing complexity of monitoring the power saving signal by the terminal device.

In a possible implementation, the first DCI and the second DCI are sent on a candidate control channel resource in a same search space set.

In the foregoing technical solution, further, the first DCI and the second DCI are transmitted in the same search space set, so that complexity of monitoring the power saving signal by the terminal device can be further reduced.

According to a third aspect, this application provides a terminal device, including modules configured to perform any one of the first aspect or the implementations of the first aspect.

According to a fourth aspect, this application provides a network device, including modules configured to perform any one of the second aspect or the implementations of the second aspect.

According to a fifth aspect, this application provides a chip. The chip is connected to a memory, and is configured to: read and execute a software program stored in the memory, to implement the method according to any one of the first aspect or the implementations of the first aspect.

According to a sixth aspect, this application provides a chip. The chip is connected to a memory, and is configured to: read and execute a software program stored in the memory, to implement the method according to any one of the second aspect or the implementations of the second aspect.

According to a seventh aspect, this application provides a terminal device, including a transceiver, a processor, and a memory, configured to perform the method according to any one of the first aspect or the implementations of the first aspect.

According to an eighth aspect, this application provides a network device, including a transceiver, a processor, and a memory, configured to perform the method according to any one of the second aspect or the implementations of the second aspect.

According to a ninth aspect, this application provides a computer-readable storage medium, including instructions. When the instructions are run on a terminal device, the terminal device is enabled to perform the method according to any one of the first aspect or the implementations of the first aspect.

According to a tenth aspect, this application provides a computer-readable storage medium, including instructions. When the instructions are run on a network device, the network device is enabled to perform the method according to any one of the second aspect or the implementations of the second aspect.

According to an eleventh aspect, this application provides a computer program product. When the computer program product runs on a terminal device, the terminal device is enabled to perform the method according to any one of the first aspect or the implementations of the first aspect.

According to a twelfth aspect, this application provides a computer program product. When the computer program product runs on a network device, the network device is enabled to perform the method according to any one of the second aspect or the implementations of the second aspect.

BACKGROUND

In new radio (NR), a terminal device in a DRX mechanism needs to simultaneously monitor DCI carried on a user equipment specific (UE specific) power saving signal and DCI carried on a user equipment group (UE group) power saving signal. A network device independently configures sizes of the two types of DCI. Consequently, complexity of monitoring the power saving signals by the terminal device is very high.

DESCRIPTION OF EMBODIMENTS

The following describes technical solutions in this application with reference to the accompanying drawings.

The technical solutions of embodiments of this application may be used in various communication systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, or a new radio (NR) system.

Figure 1:
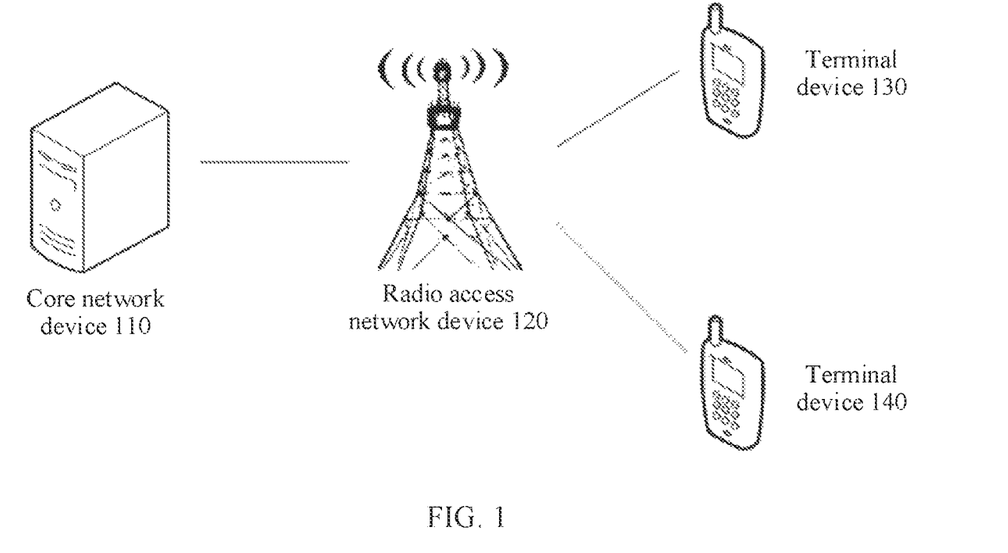
FIG. 1 is a schematic architectural diagram of a mobile communication system applied to an embodiment of this application.

FIG. 1 is a schematic architectural diagram of a mobile communication system applied to an embodiment of this application. As shown in FIG. 1, a mobile communication system may include a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be different independent physical devices, or a function of the core network device and a logical function of the radio access network device may be integrated into one physical device, or a part of a function of the core network device and a part of a function of the radio access network device may be integrated into one physical device. The terminal device may be at a fixed location, or may be mobile. FIG. 1 is only a schematic diagram. The communication system may further include another network device, for example, may further include a wireless relay device and a wireless backhaul device, which are not shown in FIG. 1. Quantities of core network devices, radio access network devices, and terminal devices included in the mobile communication system are not limited in the embodiments of this application.

The terminal device in the mobile communication system 100 may also be referred to as a terminal, user equipment (UE), a mobile station (MS), a mobile terminal (MT), or the like. The terminal device in this embodiment of this application may be a mobile phone, a tablet, or a computer with a wireless transceiver function, or may be a wireless terminal used in scenarios such as a virtual reality (VR), an augmented reality (AR), industrial control, self-driving, telemedicine, a smart grid, transportation safety, a smart city, and a smart home. In this application, the foregoing terminal device and a chip that can be used in the foregoing terminal device are collectively referred to as a terminal device. It should be understood that a specific technology and a specific device form that are used by the terminal device are not limited in the embodiments of this application.

In the mobile communication system 100, the radio access network device 120 is an access device through which the terminal device accesses the mobile communication system in a wireless manner. The radio access network device 120 may be a device configured to communicate with the terminal device. The network device may be a base transceiver station (BTS) in the global system for mobile communications (GSM) system or the code division multiple access (CDMA) system, a NodeB (NB) in the wideband code division multiple access (WCDMA) system, an evolved NodeB (eNB or eNodeB) in the LTE system, or a radio controller in a cloud radio access network (CRAN) scenario. Alternatively, the network device may be a relay node, an access point, a vehicle-mounted device, a wearable device, a network device in the future 5G network, a network device in a future evolved PLMN network, or the like. It should be understood that a specific technology and a specific device form that are used by the radio access network device are not limited in the embodiments of this application. In this application, the radio access network device is referred to as a network device for short. Unless otherwise specified, in this application, all network devices are radio access network devices. In this application, the network device may be a network device itself, or may be a chip used in the network device to complete a wireless communication processing function.

It should be understood that division of manners, cases, types, and embodiments in the embodiments of this application are merely for ease of description, but should not constitute any special limitation, and features in various manners, types, cases, and embodiments may be combined when there is no contradiction.

It should be further understood that the terms "first", "second", and "third" in the embodiments of this application are used for distinguishing purposes only, and should not be construed as any limitation on this application. For example, a "first control resource set" in the embodiments of this application represents a set of downlink control channels.

It should be understood that sequence numbers of the processes do not mean execution sequences in various embodiments of this application. The execution sequences of the processes should be determined based on functions and internal logic of the processes, and should not be construed as any limitation on the implementation processes of the embodiments of this application.

It should be noted that, in the embodiments of this application, "preset" or "preconfiguration" may be implemented by pre-storing corresponding code or a corresponding table in a device (for example, the terminal device or the network device) or in another manner that can be used to indicate related information. A specific implementation of "preset" or "preconfiguration" is not limited in this application.

It should be further noted that the term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

An NR communication system is used as an example. In NR, the terminal device may be in different states, and one of the states is a radio resource control connected (RRC_CONNECTED) state. In the RRC_CONNECTED state, the UE has established an RRC context, that is, the terminal device has established an RRC connection. In other words, a parameter necessary for communication between the terminal device and the radio access network device is known to both the terminal device and the radio access network device. The RRC_CONNECTED state is mainly used by the terminal device to transmit data.

Usually, a packet-based data stream is usually bursty. There is data transmission in a time period, but there is no data transmission in a following relatively long time period. Therefore, in NR, a discontinuous reception (DRX) processing procedure may be configured for the terminal device. When there is no data transmission, the terminal device may be enabled to stop monitoring a physical downlink control channel (PDCCH), to reduce power consumption, thereby increasing battery use time.

Figure 2:
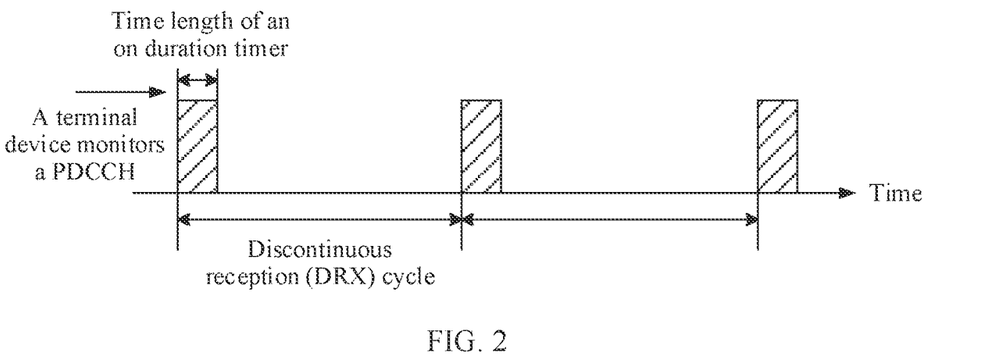
FIG. 2 is a schematic diagram of a discontinuous reception cycle according to an embodiment of this application.

FIG. 2 is a schematic diagram of a discontinuous reception cycle according to an embodiment of this application. As shown in FIG. 2, in DRX, a network device may configure a DRX cycle for a terminal device in an RRC_CONNECTED state. The DRX cycle includes an "on duration" time range, and in the "on duration" time period, the terminal device may monitor a PDCCH. The terminal device starts an on duration timer (or referred to as drx-onDuration Timer) at a start location of each DRX cycle (that is, a start location of the "on duration" time period). The time range may be a time length of the on duration timer, and a range of the time length may be 1 millisecond to 1200 milliseconds (ms).

Figure 3:
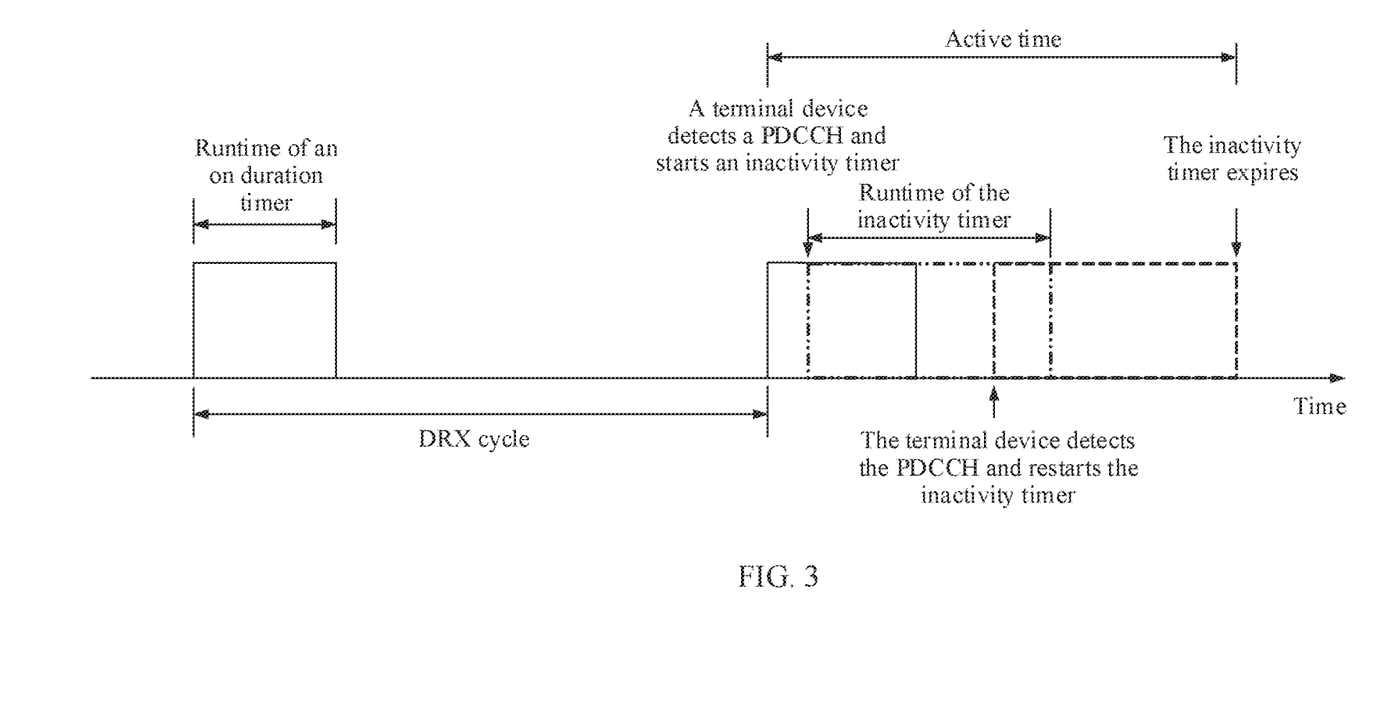
FIG. 3 is a schematic diagram of another discontinuous reception cycle according to an embodiment of this application.

As shown in FIG. 3, in the "on duration" time period, if the terminal device detects no PDCCH, the terminal device may disable a receive circuit and enter a sleep state in a remaining time period of the DRX cycle, to reduce power consumption of the terminal device; or if the terminal device detects the PDCCH, the terminal device starts an inactivity timer (or referred to as drx-Inactivity Timer) in the DRX mechanism. If the terminal device continues monitoring the PDCCH and detects the PDCCH within runtime of the inactivity timer, the terminal device restarts the inactivity timer, and starts counting again. If the inactivity timer is running, the terminal device still continues monitoring the PDCCH until the inactivity timer expires even if the on duration timer expires (that is, the "on duration" time period ends).

In NR, the terminal device works in a larger radio frequency bandwidth and a larger baseband bandwidth. In one DRX cycle, the terminal device needs to first wake up from the sleep state, enable a radio frequency circuit and a baseband circuit, obtain time-frequency synchronization, and then monitor the PDCCH in the "on duration" time period. These processes consume a large amount of power. However, data transmission is usually bursty and sparse in terms of time. If the network device does not perform any data scheduling for the terminal device in the "on duration" time period, unnecessary power consumption is caused for the terminal device. Therefore, to reduce power consumption, a power saving signal/channel is introduced in NR, and is referred to as a power saving signal below.

The terminal device may monitor a power saving signal wake-up signal (WUS) out of DRX active time (out of active time), and the power saving signal may function as a wake-up signal (WUS). The following uses the WUS as an example to describe the power saving signal.

Figure 4:
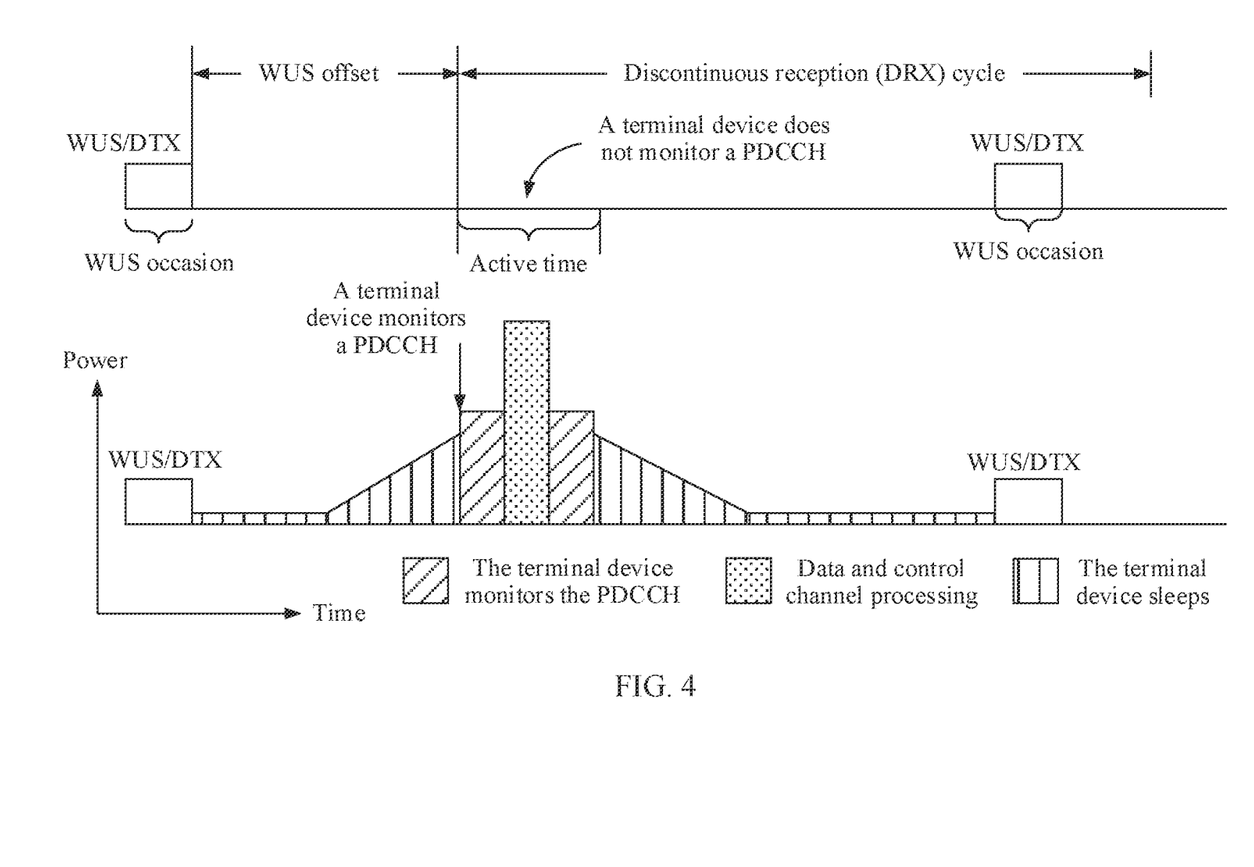
FIG. 4 is a schematic diagram of combining a WUS and a DRX mechanism.

FIG. 4 is a schematic diagram of combining a WUS and a DRX mechanism. As shown in FIG. 4, for a terminal device supporting the WUS, there is a "WUS occasion" (where the WUS occasion may be understood as a subframe or a slot in which the WUS is located) existing before a start location of "on duration" of each DRX cycle and corresponding to the terminal device. A network device may send the WUS for the terminal device in a form of discontinuous transmission (DTX) on the "WUS occasion". To be specific, the network device determines, based on a requirement for data scheduling, whether to send the WUS on the "WUS occasion", and the terminal device needs to monitor the WUS on the "WUS occasion" to determine whether the network device sends the WUS. When the terminal device "sleeps", the terminal device may monitor and demodulate the WUS in a state with extremely low power consumption (where for example some modem functions are enabled or only a simple receive circuit is used). As shown in FIG. 4, when the terminal device detects no WUS on the "WUS occasion" or a detected WUS indicates that there is no data scheduling for the terminal device in the corresponding "on duration" time period, the terminal device may directly enter a sleep state, and does not need to monitor a PDCCH in the "on duration" time period. However, if the terminal device detects the WUS on the "WUS occasion" or the detected WUS indicates that there is data scheduling for the terminal device in the corresponding "on duration" time period, the terminal device "wakes up" from the sleep state. That is, in this case, the terminal device may start a timer based on the foregoing DRX mechanism procedure to monitor the PDCCH. In this case, the terminal device needs sufficient time to enable all modem functions, so that the terminal device can monitor the PDCCH and receive a data channel in the DRX cycle. Therefore, there is a time interval between the "WUS occasion" and the start time location of the "on duration", and the time interval may be referred to as a "WUS offset", or may be referred to as a gap value. The time interval is usually represented by using a parameter T. The parameter may be configured by using higher layer signaling (where a range of a value of the parameter is several milliseconds to hundreds of milliseconds). The network device may determine the value of the parameter based on a capability reported by the terminal device.

For a design of a power saving signal, a design of a PDCCH in existing NR may be multiplexed, that is, the power saving signal is designed as a downlink control channel (or referred to as a PDCCH-based power saving signal/channel). The power saving signal may be a terminal device specific PDCCH, and DCI carried on the power saving signal may include some information fields (or referred to as power saving information), for example, a bandwidth part identifier (BWP ID) indicator, a cross-slot or same-slot scheduling indicator, a reference signal (RS) transmission indicator (including an aperiodic channel state information reference signal (CSI-RS), a T (tracking) RS, and a channel sounding reference signal (SRS)), channel state information (CSI) reporting, a single-carrier or multi-carrier indicator (that is, indicating whether the terminal device receives data by using a plurality of carriers), whether the terminal device monitors the PDCCH in DRX active time, and whether the UE "wakes up". This information is in some parameters required when the terminal device monitors a data channel (for example, in the DRX active time). However, to reduce network-side resource consumption, the power saving signal may also be designed as a PDCCH (or referred to as a UE group downlink control channel) shared by a plurality of terminal devices, and the network device configures a group of terminal devices to monitor a same group PDCCH. The group PDCCH carries group DCI, to indicate power saving information (for example, whether the terminal device "wakes up") corresponding to each terminal device in the group. In this way, the UE may need to simultaneously monitor a UE specific power saving signal and a UE group power saving signal out of the DRX active time.

However, in NR, a terminal device in the DRX mechanism needs to simultaneously monitor DCI carried on the UE specific power saving signal and DCI carried on the UE group power saving signal. Consequently, complexity of monitoring the power saving signals by the terminal device is very high.

To resolve the foregoing problem, this application proposes a signal transmission method, to reduce complexity and power consumption of monitoring the power saving signals by the terminal device.

Figure 5:
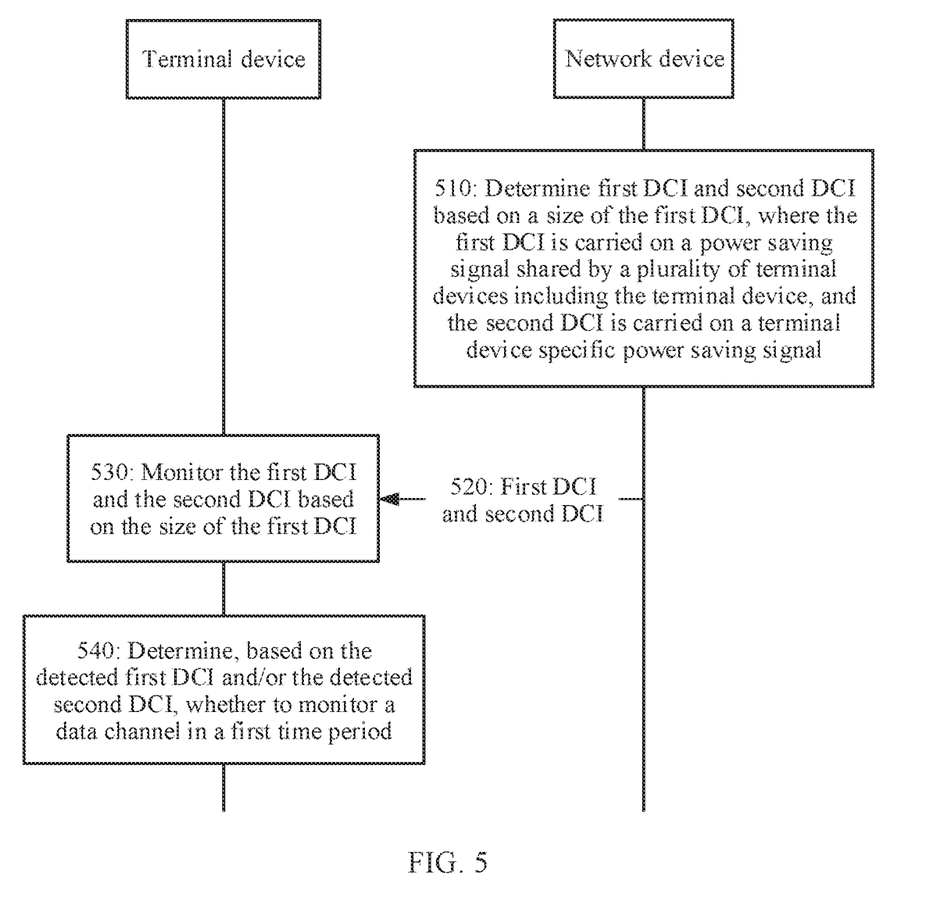
FIG. 5 is a schematic diagram of a structure of a signal transmission method according to an embodiment of this application.

FIG. 5 is a schematic diagram of a structure of a signal transmission method according to an embodiment of this application. The method in FIG. 5 may be used in the terminal device 130 or the terminal device 140 and the radio access network device 120 in the wireless communication system shown in FIG. 1. In this embodiment of this application, an example in which a terminal device and a network device are used as execution bodies is used for description. It should be understood that the execution bodies may alternatively be a chip used in the terminal device and a chip used in the network device. This is not specifically limited in this embodiment of this application. The method in FIG. 5 includes at least a part of the following content.

In 510: The network device determines first DCI and second DCI based on a size of the first DCI, where the first DCI is carried on a power saving signal shared by a plurality of terminal devices including the terminal device, and the second DCI is carried on a terminal device specific power saving signal.

A first power saving signal is the power saving signal shared by a plurality of terminal devices including the terminal device. For example, the network device centrally sends a group PDCCH to terminal devices in a service range of the network device. Optionally, the plurality of terminal devices may be a plurality of terminal devices in one terminal device group, and the terminal device group may be classified based on a service type, a communication manner, or the like. For example, the terminal device group may be a group of terminal devices in multicast transmission, terminal devices with a same DRX parameter (including a DRX cycle, a start time location of the DRX cycle, a length of an on duration timer, a length of an inactivity timer, and the like), or the like. Optionally, the plurality of terminal devices may alternatively be all terminal devices in one cell.

A second power saving signal is the terminal device specific power saving signal, which may mean that a PDCCH of the first power saving signal is specific to the terminal device, and DCI carried on the PDCCH is also specific to the terminal device.

Optionally, the size of the first DCI is the same as a size of the second DCI. That the size of the first DCI is the same as the size of the second DCI may be that a quantity of bits of the first DCI is the same as a quantity of bits of the second DCI. In an example, to improve monitoring performance of a power saving signal, a size of DCI carried on the power saving signal should be relatively small, and in an existing NR standard, a minimum value of the DCI is 12 bits. Therefore, both the quantity of bits of the first DCI and the quantity of bits of the second DCI may be 12.

In this embodiment of this application, that the size of the first DCI is the same as the size of the second DCI means that sizes of the first DCI and the second DCI that are actually sent by the network device to the terminal device are the same. A quantity of information bits of the first DCI and a quantity of information bits of the second DCI that are initially configured by using higher layer signaling or initially obtained through predefinition in a standard may be different. For ease of description, in this embodiment of this application, a quantity of information bits of DCI is used to represent initial DCI. That is, the quantity of information bits of the DCI is a quantity of information bits that exist before the network device performs padding or truncating on a bit sequence of the DCI. A size of the DCI represents a quantity of bits of actually transmitted DCI.

When the quantity of information bits of or the size of the first DCI is different from the quantity of information bits of or the size of the second DCI, the network device needs to adjust the quantity of information bits of the first DCI and/or the quantity of information bits of the second DCI, to enable a size of actually transmitted first DCI and a size of actually transmitted second DCI to be the same.

There are many methods for adjusting the size of the first DCI and/or the size of the second DCI to be the same. This is not specifically limited in this embodiment of this application.

In an example, the size of the second DCI is adjusted to be the same as the size (or the quantity of information bits) of the first DCI. For example, when the size n1 (or a quantity of information bits) of the first DCI is greater than a quantity n2 of information bits of the second DCI, the network device adds (n2-n1) padding bits to an information bit sequence of the second DCI, to enable both the size of the first DCI and the size of the second DCI to be n1, where a state of the padding bit may be 0 or 1. For another example, when the size n1 (or a quantity of information bits) of the first DCI is less than a quantity n2 of information bits of the second DCI, the network device truncates n1 information bits in an information bit sequence of the second DCI, to enable both the size of the first DCI and the size of the second DCI to be n1. For an information field that is not truncated, the terminal device may consider that a status value of the information field that is not truncated is a predefined or preconfigured status value. For example, the terminal device may consider that status values of all information fields that are not truncated are 0. For example, a carrier transmission (single-carrier or multi-carrier transmission) indicator information field is not truncated, and the terminal device may assume that the network device indicates the information field to be 0 (that is, single-carrier transmission). In this case, the terminal device monitors, on a primary carrier, data scheduled by the network device for the terminal device.

It may be understood that when the size n1 (or the quantity of information bits) of the first DCI is less than the quantity n2 of information bits of the second DCI, the network device may also truncate (n2-n1) information bits, to enable both the size of the first DCI and the size of the second DCI to be n1.

In another example, the size of the first DCI is adjusted to be the same as the size of the second DCI. For a specific implementation, an implementation in which the size of the second DCI is adjusted to be the same as the size of the first DCI may be used. Details are not described herein again. In this case, in 510, the network device determines the first DCI and the second DCI based on the size of the second DCI.

In still another example, the network device may alternatively simultaneously adjust the size of the first DCI and the size of the second DCI. To be specific, a base station configures, by using higher layer signaling, or predefines, in a standard, a size value N common to the first DCI and the second DCI, and the base station determines the sizes (for example, may be equal to N) of the first DCI and the second DCI by using the size value. A specific implementation is similar to the foregoing implementation. Details are not described herein again. In this case, the terminal device may monitor the first DCI and the second DCI by using the same size value N. For example, bits are padded in information bit sequences of the first DCI and the second DCI, and sizes of the first DCI and the second DCI are the same, for example, each are 12 bits.

Optionally, the first DCI and/or the second DCI may be configured by using higher layer signaling. For example, a size (namely, a quantity of bits) of each information field of the first DCI and/or a size of each information field of the second DCI are/is configured by using higher layer signaling. In this embodiment of this application, the higher layer signaling may be radio resource control (RRC) signaling, or may be media access control (MAC) layer signaling. A configuration method is not limited in this embodiment of this application.

The second DCI, that is, DCI carried on the terminal device specific power saving signal, may include first power saving information used to indicate whether the terminal device monitors a control channel and/or a data channel in a first time period, and may be further used to indicate second power saving information used to indicate a parameter used by the terminal device to monitor a control channel and/or a data channel in the first time period. The parameter used by the terminal device to monitor a data channel in the first time period may include a bandwidth part identifier (BWP ID) indicator, a cross-slot or same-slot scheduling indicator, an RS transmission indicator (including an aperiodic CSI-RS, a TRS, or an SRS), channel state information (CSI) reporting, and a single-carrier or multi-carrier indicator (that is, indicating whether the UE receives data by using a plurality of carriers, and may further include a quotation mark on a secondary carrier of the received data). Considering that the first power saving signal is a shared signal, and a priority of the first power saving signal is usually higher than that of a specific signal, when resources are limited, there is a low probability that the first power saving signal cannot be sent. Therefore, to make a power saving signal exert a full effect, the first DCI in this embodiment of this application also carries the parameter used to indicate the terminal device to monitor a data channel and/or a control channel in the first time period. In this way, when the resources are limited, the terminal device may still obtain the parameter used by the terminal device to monitor a data channel in the first time period, so that a power saving signal exerts a full effect. Specifically, in this embodiment of this application, in addition to a plurality of pieces of third power saving information used to indicate whether the plurality of terminal devices monitor a control channel and/or a data channel in the first time period, the first DCI further includes a plurality of pieces of fourth power saving information used to indicate parameters used by the plurality of terminal devices to monitor a data channel and/or a control channel in the first time period.

The first time period in this embodiment of this application may be DRX active time of the terminal device, for example, the active time shown in FIG. 3. Start moments and duration of active time of different terminal devices may be different, that is, first time periods in which different terminal devices monitor a data channel may be different. That is, the base station may send the first DCI and the second DCI out of the DRX active time (out of active time) (or out of the first time period), and the terminal device simultaneously monitors the first DCI and the second DCI out of the DRX active time (out of active time) (or out of the first time period).

Optionally, the base station may send the first DCI and the second DCI in the DRX active time, and the terminal device simultaneously monitors the first DCI and the second DCI in the DRX active time. The second DCI, that is, the DCI carried on the terminal device specific power saving signal, may be further used to indicate fifth power saving information used to indicate a parameter used by the terminal device to monitor a control channel and/or a data channel in the DRX active time. The parameter used by the terminal device to monitor a control channel and/or a data channel in the DRX active time may include a CORESET, a search space set, or a candidate PDCCH in which the terminal device needs to monitor or stop monitoring a PDCCH, a periodicity in which the terminal device performs monitoring in the search space set, a periodicity in which the terminal monitors the PDCCH (PDCCH monitoring periodicity), a time period for the terminal device to stop monitoring the PDCCH (PDCCH skipping), a quantity of receive antennas or a quantity of multiple-input multiple-output (MIMO) layers of the terminal device, cross-slot or same-slot scheduling, and a carrier (for example, may be a secondary carrier, SCell) on which the terminal device monitors or stops monitoring the PDCCH. The first time period may be a time length of the CORESET, the search space set, or the candidate PDCCH in which the terminal device stops monitoring the PDCCH in the DRX active time, or a time length in which the terminal device stops monitoring the PDCCH. Certainly, the method may also be used in a case in which no DRX mechanism is configured for the terminal device.

Optionally, the first DCI includes at least one information block, each of the at least one information block includes at least one information field, and different information blocks are used to indicate parameters used by different terminal device to monitor a data channel and/or a control channel in the first time period.

For example, the first DCI is shared by 10 terminal devices. The first DCI may include one information block, but the information block includes fourth power saving information respectively corresponding to the 10 terminal devices. The first DCI may alternatively include two information blocks, where one information block includes fourth power saving information of five terminal devices, and the other information block includes fourth power saving information of the remaining five terminal devices. The first DCI may alternatively include 10 information blocks, and the 10 information blocks are in a one-to-one correspondence with the 10 terminal devices. It should be understood that the specific values involved herein are merely simple examples for ease of understanding the technical solutions in the embodiments of this application. During specific implementation of the technical solutions in the embodiments of this application, there may be larger values or more complex manners.

Optionally, for one terminal device, the third power saving information and the fourth power saving information may be carried in a same information block, or may be carried in different information blocks.

The first DCI indicates a plurality of pieces of fourth power saving information in many manners. This is not specifically limited in this embodiment of this application.

In an example, the first DCI may directly carry the plurality of pieces of fourth power saving information.

For example, an information block corresponding to a terminal device A may include an information field included in second DCI corresponding to the terminal device A.

Optionally, information fields included in at least two of at least one information block in the first DCI are different. In other words, for different terminal devices, the information block in the first DCI may include different information fields.

For example, the first DCI may include four information blocks, the four information blocks respectively correspond to four terminal devices, and the four terminal devices are respectively terminal devices 1 to 4. An information block of the terminal device 1 may include a BWP ID information field, an information block of the terminal device 2 may include a time domain scheduling indicator (cross-slot or same-slot) information field, an information block of the terminal device 3 may include an RS transmission indicator (including an aperiodic CSI-RS, a TRS, or an SRS) information field, and an information block of the terminal device 4 may include a carrier transmission indicator (single-carrier or multi-carrier) information field.

It should be noted that this example may also be used in a case in which the first DCI and the second DCI are transmitted in the DRX active time, or in a case in which the DRX mechanism is not configured, and details are not described herein again.

In another example, the first DCI may indirectly indicate the plurality of pieces of fourth power saving information.

For example, the first DCI may indicate some combinations of information fields included in the second DCI corresponding to the terminal device. Specifically, second DCI of a terminal device includes a plurality of information fields, and an information block corresponding to the terminal device in the first DCI may indicate one of several status value combinations of several information fields included in the second DCI configured by higher layer signaling or predefined in the standard. For example, second DCI of a terminal device A includes a BWP ID information field, a time domain scheduling indicator (cross-slot or same-slot) information field, a trigger RS resource indicator information field, and a carrier transmission indicator information field. An information block corresponding to the terminal device A in the first DCI may use two bits, and status values of the two bits may indicate status values of the foregoing four information fields. A table 1 shows a correspondence between some of the two bits and the foregoing four information fields.

In another aspect, an information field of an information block in first DCI may indicate a row of a table, and each row of the table includes a value parameter of an information field in second DCI of UE corresponding to the information block. That is, the information field of the information block in the first DCI may indicate values of a plurality of information fields in the second DCI. Details are shown in the table 1.

In other words, the information field in the information block in the first DCI is used to indicate a status value in a first status value set, a status value of the information field in the second DCI is a status value in a second status value set, and the first status value set is a subset of the second status value set. For example, as shown in the table 1, the first column represents status values of information fields of information blocks of the first DCI, and the second column represents combinations of four status values of four information fields in the second DCI. In the first DCI, four status values of two bits are used to represent four possible combinations of the foregoing four information field status values. Actually, there are more than four combinations of status values of information fields.

TABLE 1

| | |
|---|---|
| 00 | BWP ID = "00", time domain scheduling indicator = "0", trigger RS resource indicator = "00", carrier transmission indicator = "0" |
| 01 | BWP ID = "11", time domain scheduling indicator = "1", trigger RS resource indicator = "11", carrier transmission indicator = "1" |
| 10 | BWP ID = "10", time domain scheduling indicator = "1", trigger RS resource indicator = "01", carrier transmission indicator = "0" |

TABLE 1-continued

| | |
|---|---|
| 11 | BWP ID = "11", time domain scheduling indicator = "0", trigger RS resource indicator = "00", carrier transmission indicator = "0" |

It should be understood that the table 1 shows only one possible correspondence, and there may alternatively be another correspondence in this embodiment of this application. This is not limited. In addition, the second DCI may include more or fewer information fields, and the first DCI may include more or fewer bits, or the like.

Similarly, for different terminal devices, a combination of status values of different information fields may be indicated in an information block in the first DCI. For example, the second DCI of the terminal device A includes the BWP ID information field, the time domain scheduling indicator (cross-slot or same-slot) information field, the trigger RS resource indicator information field, and the carrier transmission indicator information field. The information block corresponding to the terminal device A in the first DCI may use two bits to indicate status values of the foregoing four information fields. Second DCI of a terminal device B includes the trigger RS resource indicator information field and the carrier transmission indicator information field. An information block corresponding to the terminal device A in the first DCI may use two bits to indicate status values of the foregoing two information fields.

It may be understood that a status value in the first status value set indicated by the information field of the information block in the first DCI may be the same as or different from a status value of the information field in the second DCI. For example, for the terminal device A, the information fields of the information block corresponding to the terminal device A in the first DCI are as follows: The BWP ID="00", the time domain scheduling indicator="0", the trigger RS resource indicator="00", and the carrier transmission indicator="0". The status values of the information fields in the second DCI are as follows: The BWP ID="00", the time domain scheduling indicator="0", the trigger RS resource indicator="00", and the carrier transmission indicator="0". Alternatively, the information fields of the information block corresponding to the terminal device A in the first DCI are as follows: The BWP ID="00", the time domain scheduling indicator="0", the trigger RS resource indicator="00", and the carrier transmission indicator="0". The status values of the information fields in the second DCI are as follows: The BWP ID="10", the time domain scheduling indicator="1", the trigger RS resource indicator="01", and the carrier transmission indicator="0".

It should be noted that this example may also be used in a case in which the first DCI and the second DCI are transmitted in the DRX active time, or in a case in which the DRX mechanism is not configured, and details are not described herein again.

In some special cases, the second DCI may fail to be sent. For example, the second power saving signal cannot be sent due to limited resources. To reduce impact caused by the second power saving signal being blocked and improve power saving performance of the power saving signal, in this embodiment of this application, when the first DCI is a first bit sequence value, the first DCI may be used to indicate the plurality of terminal devices to monitor a data channel and/or a control channel in the first time period, or indicate all terminal devices in a cell to monitor a data channel and/or a control channel in the first time period. In other words, one status value of the first DCI may be reserved for waking up the entire group of terminal devices. Because the first power saving signal is a shared signal, and a priority of the first power saving signal is usually higher than that of a specific signal, when resources are limited, there is a low probability that the first power saving signal cannot be sent. Therefore, the impact caused by the second power saving signal being blocked can be reduced, and the power saving performance of the power saving signal can be improved.

Optionally, the first bit sequence value may mean that all bits of the first DCI are 0 or 1.

It may be understood that in this embodiment of this application, at least one bit may be further added to the first DCI, and is specifically used to wake up the entire group of terminal devices.

Optionally, to distinguish between the first DCI and the second DCI, the first DCI and the second DCI may use different radio network temporary identifiers (RNTIs).

In 520: The network device sends the first DCI and the second DCI to the terminal device.

Optionally, the network device may transmit the first DCI and the second DCI in a same control resource set (CORE-SET).

Further, the network device may transmit the first DCI and the second DCI on a candidate control channel resource in a same search space set.

In 530: The terminal device monitors the first DCI and the second DCI based on the size of the first DCI.

When the network device determines the first DCI and the second DCI based on the size of the first DCI, the terminal device may monitor the first DCI and the second DCI based on the size of the first DCI. It may be understood that when the network device determines the first DCI and the second DCI based on the size of the second DCI, the terminal device may monitor the first DCI and the second DCI based on the size of the second DCI. Similarly, the terminal device may monitor the first DCI and the second DCI in the same CORESET. Further, the terminal device may monitor the first DCI and the second DCI on a candidate control channel resource in the same search space set.

In 540: The terminal device determines, based on the detected first DCI and/or the detected second DCI, whether to monitor a data channel and/or a control channel in the first time period.

In the signal transmission method in this application, the terminal device may monitor the two types of DCI: the first DCI and the second DCI based on the size of the first DCI, so that complexity of monitoring the power saving signals by the terminal device can be reduced.

It may be understood that the method in this embodiment of this application is not limited to be used for transmission of a power saving signal, and may also be used for transmission of another signal provided that DCI sizes are different and monitoring complexity of the terminal device needs to be reduced.

The following describes apparatus embodiments of this application with reference to FIG. 6 to FIG. 9.

Figure 6:
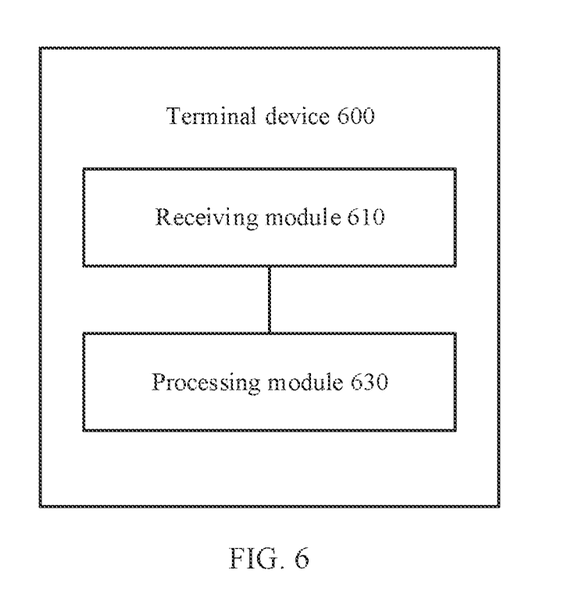
FIG. 6 is a schematic diagram of a structure of a terminal device according to an embodiment of this application.

FIG. 6 is a schematic diagram of a structure of a terminal device according to an embodiment of this application. The terminal device 600 shown in FIG. 6 may correspond to the foregoing terminal device. As shown in FIG. 6, the terminal device 600 includes a receiving module 610 and a processing module 630.

The receiving module 610 is configured to monitor, based on a size of first downlink control information (DCI), the first DCI and second DCI that are sent by a network device, where the first DCI is carried on a power saving signal shared by a plurality of terminal devices including the terminal device, and the second DCI is carried on a terminal device specific power saving signal.

The processing module 630 is configured to determine, based on the detected first DCI and/or the detected second DCI, whether to monitor a data channel in a first time period.

Optionally, the size of the first DCI is the same as a size of the second DCI.

Optionally, the first DCI includes at least one information block, each of the at least one information block includes at least one information field, and different information blocks are used to indicate parameters used by different terminal devices to monitor a data channel in the first time period; and the at least one information block includes a first information block, and an information field in the first information block is used to indicate a parameter used by the terminal device to monitor a data channel in the first time period.

Optionally, information fields included in at least two of the at least one information block are different.

Optionally, the information field in the first information block is used to indicate a status value in a first status value set, a status value of an information field in the second DCI is a status value in a second status value set, and the first status value set is a subset of the second status value set.

Optionally, when the first DCI is a first bit sequence value, the first DCI is used to indicate the plurality of terminal devices to monitor a data channel in the first time period.

Optionally, monitoring of the first DCI and monitoring of the second DCI are performed in a same control resource set (CORESET).

Optionally, monitoring of the first DCI and monitoring of the second DCI are performed on a candidate control channel resource in a same search space set.

Optionally, when the size n1 of the first DCI is greater than a quantity n2 of information bits of the second DCI, both the size of the first DCI and the size of the second DCI are n2, and (n2-n1) bits in the second DCI are padding bits.

Optionally, when the size n1 of the first DCI is less than a quantity n2 of information bits of the second DCI, both the size of the first DCI and the size of the second DCI are n1, and the second DCI is n1 information bits of the n2 information bits of the second DCI.

The receiving module 610 may be implemented by a transceiver. The processing module 630 may be implemented by a processor. For specific functions and beneficial effects of the receiving module 610 and the processing module 630, refer to the method shown in FIG. 5. Details are not described herein again.

Figure 7:
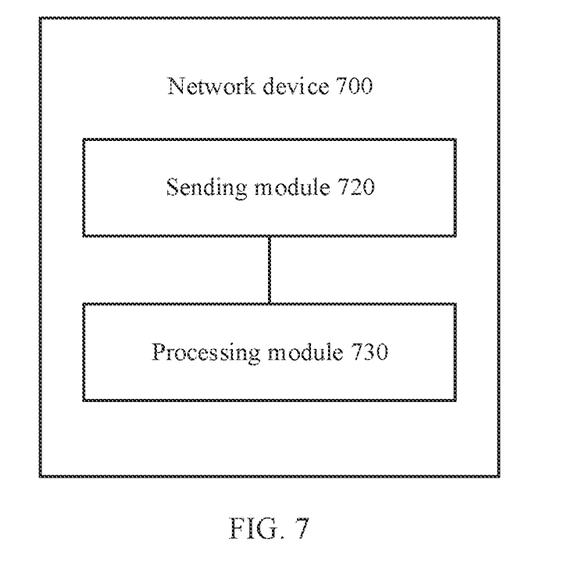
FIG. 7 is a schematic diagram of a structure of a network device according to an embodiment of this application.

FIG. 7 is a schematic diagram of a structure of a network device according to an embodiment of this application. The network device 700 shown in FIG. 7 may correspond to the foregoing network device. As shown in FIG. 7, the network device 700 includes a sending module 720 and a processing module 730.

The processing module 730 is configured to determine first DCI and second DCI based on a size of the first DCI, where the first DCI is carried on a power saving signal shared by a plurality of terminal devices including the terminal device, and the second DCI is carried on a terminal device specific power saving signal.

The sending module 720 is configured to send the first DCI and the second DCI to the terminal device.

Optionally, in a possible implementation, the size of the first DCI is the same as a size of the second DCI.

Optionally, the processing module 730 is specifically configured to: when the size n1 of the first DCI is greater than a quantity n2 of information bits of the second DCI, add (n2-n1) padding bits to a bit sequence of the second DCI, to enable both the size of the first DCI and the size of the second DCI to be n1.

Optionally, the processing module 730 is specifically configured to: when the size n1 of the first DCI is less than a quantity n2 of information bits of the second DCI, truncate n1 information bits in an information bit sequence of the second DCI, to enable both the size of the first DCI and the size of the second DCI to be n1.

Optionally, the first DCI includes at least one information block, each of the at least one information block includes at least one information field, and different information blocks are used to indicate parameters used by different terminal devices to monitor a data channel in a first time period; and the at least one information block includes a first information block, and an information field in the first information block is used to indicate a parameter used by the terminal device to monitor a data channel in the first time period.

Optionally, information fields included in at least two of the at least one information block are different.

Optionally, the information field in the first information block is used to indicate a status value in a first status value set, a status value of an information field in the second DCI is a status value in a second status value set, and the first status value set is a subset of the second status value set.

Optionally, when the first DCI is a first bit sequence value, the first DCI is used to indicate the plurality of terminal devices to monitor a data channel in the first time period.

Optionally, the first DCI and the second DCI are sent in a same control resource set (CORESET).

Optionally, the first DCI and the second DCI are sent on a candidate control channel resource in a same search space set.

The sending module 720 may be implemented by a transceiver. The processing module 730 may be implemented by a processor. For specific functions and beneficial effects of the sending module 720 and the processing module 730, refer to the method shown in FIG. 5. Details are not described herein again.

Figure 8:
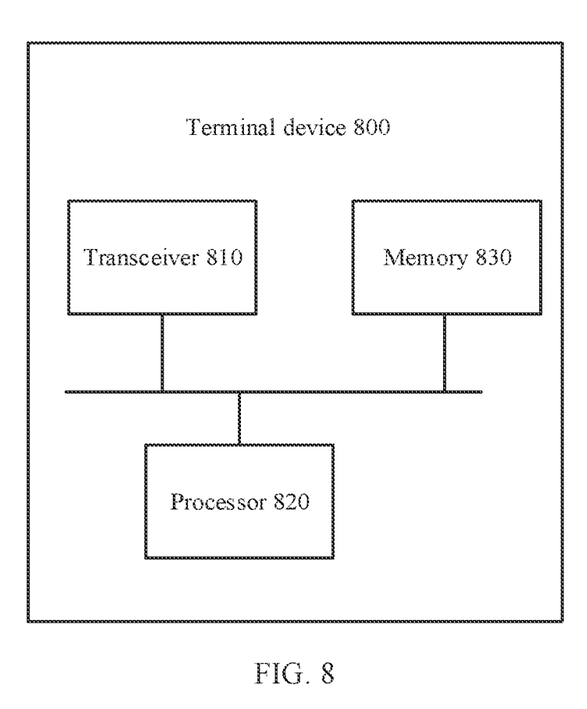
FIG. 8 is a schematic diagram of a structure of a terminal device according to another embodiment of this application.

FIG. 8 is a schematic diagram of a structure of a terminal device according to another embodiment of this application. As shown in FIG. 8, the terminal device 800 may include a transceiver 810, a processor 820, and a memory 830.

FIG. 8 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

The transceiver 810, the processor 820, and the memory 830 communicate with each other through an internal connection path and transfer a control signal and/or a data signal.

Specifically, the transceiver 810 is configured to monitor, based on a size of first downlink control information (DCI), the first DCI and second DCI that are sent by a network device, where the first DCI is carried on a power saving signal shared by a plurality of terminal devices including the terminal device, and the second DCI is carried on a terminal device specific power saving signal.

The processor 820 is configured to determine, based on the detected first DCI and/or the detected second DCI, whether to monitor a data channel in a first time period.

For a specific working process and beneficial effects of the terminal device 800, refer to the descriptions in the embodiment shown in FIG. 5. Details are not described herein again.

Figure 9:
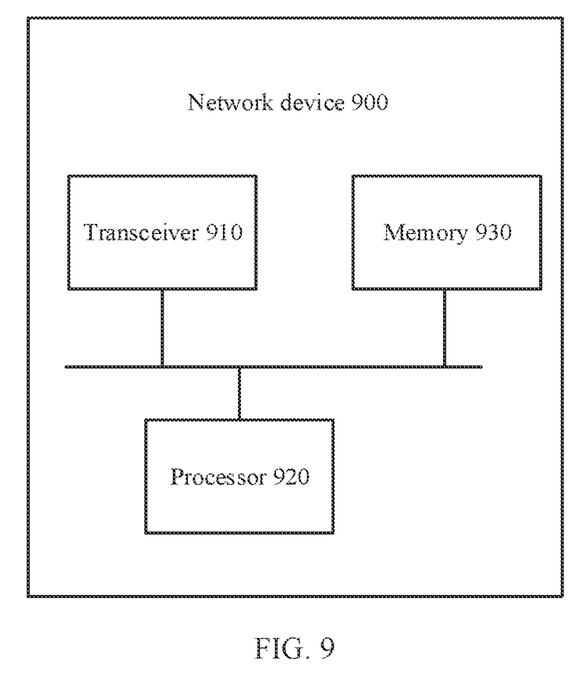
FIG. 9 is a schematic diagram of a structure of a network device according to another embodiment of this application.

FIG. 9 is a schematic diagram of a structure of a network device according to another embodiment of this application. As shown in FIG. 9, the network device 900 may include a transceiver 910, a processor 920, and a memory 930.

FIG. 9 shows only one memory and one processor. In an actual network device product, there may be one or more processors and one or more memories. The memory may also be referred to as a storage medium, a storage device, or the like. The memory may be disposed independent of the processor, or may be integrated with the processor. This is not limited in this embodiment of this application.

The transceiver 910, the processor 920, and the memory 930 communicate with each other through an internal connection path and transfer a control signal and/or a data signal.

Specifically, the processor 920 is configured to determine first DCI and second DCI based on a size of the first DCI, where the first DCI is carried on a power saving signal shared by a plurality of terminal devices including the terminal device, and the second DCI is carried on a terminal device specific power saving signal.

The transceiver 910 is configured to send the first DCI and the second DCI to the terminal device.

For a specific working process and beneficial effects of the network device 900, refer to the descriptions in the embodiment shown in FIG. 5. Details are not described herein again.

The transceiver in the embodiments of this application may also be referred to as a transceiver unit, a transceiver machine, a transceiver apparatus, or the like. The processor may also be referred to as a processing unit, a processing board, a processing module, a processing apparatus, or the like. Optionally, a component that is in the transceiver and that is configured to implement a receiving function may be considered as a receiving unit, and a component that is in the transceiver and that is configured to implement a sending function may be considered as a sending unit. In other words, the transceiver includes the receiving unit and the sending unit. The receiving unit may also be sometimes referred to as a receiver machine, a receiver, a receiver circuit, or the like. The sending unit may also be sometimes referred to as a transmitter machine, a transmitter, a transmitter circuit, or the like.

The memory described in the embodiments of this application is configured to store computer instructions and a parameter for running the processor.

The processor in the embodiments of this application may be an integrated circuit chip, and has a signal processing capability. In an implementation process, steps in the foregoing method may be implemented by using a hardware integrated logic circuit in the processor or by using instructions in a form of software. The processor in the embodiments of this application may be a general purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and logic block diagrams that are disclosed in the embodiments of this application may be implemented or performed. The general purpose processor may be a microprocessor, or the processor may be any conventional processor or the like. The steps of the methods disclosed with reference to the embodiments of this application may be directly presented as being performed and completed by a hardware decoding processor, or performed and completed by a combination of hardware and a software module in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads instructions in the memory and completes the steps in the foregoing methods in combination with hardware of the processor.

Sequence numbers of the processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are completely or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The storage medium includes any medium that can store program code such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal transmission method, comprising:
monitoring, by a terminal device and based on a size of first downlink control information (DCI), the first DCI and second DCI that are sent by a network device, wherein the first DCI is carried on a power saving signal shared by a plurality of terminal devices comprising the terminal device, and the second DCI is carried on a terminal device specific power saving signal, wherein the first DCI comprises a first information block, and an information field in the first information block corresponds to the terminal device among the plurality of terminal devices, and the information field in the first information block indicates a status value that corresponds to a combination of status values of a plurality of information fields in the second DCI; and
determining, by the terminal device and based on at least one of the first DCI or the second DCI, whether to monitor a data channel in a first time period.

2. The method according to claim 1, wherein the size of the first DCI is the same as a size of the second DCI.

3. The method according to claim 2, wherein when the size n1 of the first DCI is greater than a quantity n2 of information bits of the second DCI, both the size of the first DCI and the size of the second DCI are n2, and (n2-n1) bits in the second DCI are padding bits.

4. The method according to claim 2, wherein when the size n1 of the first DCI is less than a quantity n2 of information bits of the second DCI, both the size of the first DCI and the size of the second DCI are n1, and the second DCI is n1 information bits of the n2 information bits of the second DCI.

5. The method according to claim 1, wherein the first DCI comprises more than one information block, each of the more than one information block comprises at least one information field, and different information blocks of the more than one information block indicate respective parameters used by different terminal devices to monitor respective data channels in the first time period; and
the more than one information block comprises the first information block, and an information field in the first information block indicates a parameter used by the terminal device to monitor a data channel in the first time period.

6. The method according to claim 5, wherein information fields comprised in at least two of the more than one information block are different.

7. The method according to claim 1, wherein when the first DCI is a first bit sequence value, the first DCI comprises indication that the plurality of terminal devices monitor respective data channels in the first time period.

8. The method according to claim 1, wherein monitoring of the first DCI and monitoring of the second DCI are performed in a same control resource set (CORESET).

9. The method according to claim 1, wherein monitoring of the first DCI and monitoring of the second DCI are performed on a candidate control channel resource in a same search space set.

10. The method according to claim 1, wherein the plurality of information fields comprise a bandwidth part identifier (BWP ID) information field, a cross-slot or same-slot information field, a trigger reference signal (RS) resource indicator information field, and a carrier transmission indicator information field.

11. A terminal device, comprising:
one or more processors; and
a non-transitory computer readable medium storing a program to be executed by the one or more processors, wherein the program comprises instructions that cause the terminal device to perform operations comprising:
monitoring, based on a size of first downlink control information (DCI), the first DCI and second DCI that are sent by a network device, wherein the first DCI is carried on a power saving signal shared by a plurality of terminal devices comprising the terminal device, and the second DCI is carried on a terminal device specific power saving signal, wherein the first DCI comprises a first information block, and an information field in the first information block corresponds to the terminal device among the plurality of terminal devices, and the information field in the first information block indicates a status value that corresponds to a combination of status values of a plurality of information fields in the second DCI; and determining, based on at least one of the first DCI or the second DCI, whether to monitor a data channel in a first time period.

12. The terminal device according to claim 11, wherein the size of the first DCI is the same as a size of the second DCI.

13. The terminal device according to claim 12, wherein when the size n1 of the first DCI is greater than a quantity n2 of information bits of the second DCI, both the size of the first DCI and the size of the second DCI are n2, and (n2−n1) bits in the second DCI are padding bits.

14. The terminal device according to claim 12, wherein when the size n1 of the first DCI is less than a quantity n2 of information bits of the second DCI, both the size of the first DCI and the size of the second DCI are n1, and the second DCI is n1 information bits of the n2 information bits of the second DCI.

15. The terminal device according to claim 11, wherein the first DCI comprises more than one information block, each of the more than one information block comprises at least one information field, and different information blocks of the more than one information block indicate respective parameters used by different terminal devices to monitor respective data channels in the first time period; and the more than one information block comprises the first information block, and an information field in the first information block indicates a parameter used by the terminal device to monitor a data channel in the first time period.

16. The terminal device according to claim 15, wherein information fields comprised in at least two of the more than one information block are different.

17. The terminal device according to claim 11, wherein when the first DCI is a first bit sequence value, the first DCI comprises indication that the plurality of terminal devices monitor respective data channels in the first time period.

18. The terminal device according to claim 11, wherein monitoring of the first DCI and monitoring of the second DCI are performed in a same control resource set (CORESET) or on a candidate control channel resource in a same search space set.

19. A non-transitory, computer-readable medium storing one or more instructions executable by a computer system to perform operations comprising:

monitoring, by a terminal device and based on a size of first downlink control information (DCI), the first DCI and second DCI that are sent by a network device, wherein the first DCI is carried on a power saving signal shared by a plurality of terminal devices comprising the terminal device, and the second DCI is carried on a terminal device specific power saving signal, wherein the first DCI comprises a first information block, and an information field in the first information block corresponds to the terminal device among the plurality of terminal devices, and the information field in the first information block indicates a status value that corresponds to a combination of status values of a plurality of information fields in the second DCI; and determining, by the terminal device and based on at least one of the first DCI or the second DCI, whether to monitor a data channel in a first time period.

\* \* \* \* \*